US011560747B2

United States Patent
Anderson et al.

(10) Patent No.: US 11,560,747 B2
(45) Date of Patent: Jan. 24, 2023

(54) SUNROOF PANEL AND SUNSHADE ASSEMBLY SYSTEM AND METHOD

(71) Applicant: GM GLOBAL TECHNOLOGY OPERATIONS LLC, Detroit, MI (US)

(72) Inventors: Yusuf Anderson, Rochester Hills, MI (US); Terrence P. Costigan, Fenton, MI (US); Besy J. Philip, Rochester Hills, MI (US); Elton J. Tate, Jr., Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 17/196,065

(22) Filed: Mar. 9, 2021

(65) Prior Publication Data
US 2022/0290485 A1    Sep. 15, 2022

(51) Int. Cl.
*E05F 15/75* (2015.01)
*E05F 15/71* (2015.01)
(Continued)

(52) U.S. Cl.
CPC ............ *E05F 15/75* (2015.01); *B60J 7/0015* (2013.01); *B60J 7/0023* (2013.01); *B60J 7/0038* (2013.01);
(Continued)

(58) Field of Classification Search
CPC . E05F 15/75; E05F 15/71; E05F 15/73; E05F 15/655; E05F 15/659; E05F 15/77;
(Continued)

(56) References Cited

U.S. PATENT DOCUMENTS 4,386,802 A * 6/1983 Cunningham ........... B60J 7/053
296/213
10,233,686 B2   3/2019 Smith et al.
(Continued)

FOREIGN PATENT DOCUMENTS

CN        111422045 A  *  7/2020

OTHER PUBLICATIONS

Fang et al. "Intelligent Automatic Skylight Control Rain Sensing Sun-shading Curtain Temperature Sensor, Has Furling Mechanism For Receiving Furling Or Opening Force Of Cooperative Traction Motor", Published: Jul. 17, 2020, Chinese Patent Office, Edition: CN-111422045-A (Year: 2020).*

*Primary Examiner* — Dennis H Pedder
*Assistant Examiner* — Joyce Eileen Hill
(74) *Attorney, Agent, or Firm* — Quinn IP Law

(57) ABSTRACT

A sunroof panel and sunshade assembly system includes a moveable sunroof panel operable to selectively move to a first closed position within a sunroof opening of a vehicle and a sunshade operable to selectively move to a second closed position within the sunroof opening. The sunshade includes a leading-edge portion and a spring force displacement member within the leading-edge portion of the sunshade, wherein the spring force displacement member is operable to deform when the sunshade contacts an obstruction while the sunshade is moving. The system further includes an electric machine providing motive force to the sunshade and a computerized sunroof panel and sunshade controller. The controller operates programming to monitor operation of the electric machine, determine a presence of the obstruction based upon the monitored operation, and command the electric machine to stop and reverse the sunshade based upon the determined presence.

19 Claims, 6 Drawing Sheets

(51) Int. Cl.
*E05F 15/659* (2015.01)
*B60J 7/00* (2006.01)

(52) U.S. Cl.
CPC ............ *E05F 15/659* (2015.01); *E05F 15/71* (2015.01); *E05Y 2201/474* (2013.01); *E05Y 2400/354* (2013.01); *E05Y 2400/54* (2013.01); *E05Y 2400/66* (2013.01); *E05Y 2900/542* (2013.01)

(58) Field of Classification Search
CPC . B60J 7/00; B60J 7/0015; B60J 7/0023; B60J 7/0038; B60J 7/0007; B60J 7/067; B60J 7/043; B60J 7/15; E05Y 2201/474; E05Y 2400/00; E05Y 2400/354; E05Y 2400/54; E05Y 2400/66; E05Y 2400/44
USPC .... 296/216.01, 216.04, 214, 223; 49/26, 28, 49/31
See application file for complete search history.

(56) References Cited

U.S. PATENT DOCUMENTS

| | | | | |
|---|---|---|---|---|
| 2001/0019217 A1* | 9/2001 | Hertel | .................... | B60J 7/0046 296/217 |
| 2005/0189794 A1* | 9/2005 | Grimm | .................. | B60J 7/0015 296/214 |
| 2015/0360545 A1* | 12/2015 | Nania | ........................ | B60J 7/06 296/223 |
| 2017/0066309 A1* | 3/2017 | Takakura | ............... | B60J 7/0015 |
| 2018/0229694 A1* | 8/2018 | Salter | .................... | B08B 7/0035 |

* cited by examiner

SUNROOF PANEL AND SUNSHADE ASSEMBLY SYSTEM AND METHOD

INTRODUCTION

The disclosure generally relates to a sunroof enabling remote activation system and method.

A vehicle may include a sunroof having a traversing panel, which in turn may selectively cover an opening in a roof of the vehicle. The sunroof may include powered movement provided by an electric actuator or electric machine. The panel may be constructed of glass, polymer, aluminum, or other similar material used in the art for vehicle panels. Other panels similar to a sunroof may be provided upon a vehicle, with a panel selectively moving from an open condition or open position to a closed condition or closed position.

SUMMARY

A sunroof panel and sunshade assembly system as provided includes a moveable sunroof panel operable to selectively move to a first closed position within a sunroof opening of a vehicle and a sunshade operable to selectively move to a second closed position within the sunroof opening. The sunshade includes a leading-edge portion disposed along an edge of the sunshade in a direction in which the sunshade moves to reach the second closed position, and a spring force displacement member within the leading-edge portion of the sunshade. The spring force displacement member is operable to deform when the sunshade contacts an obstruction while the sunshade is moving to the second closed position. The system further includes an electric machine providing motive force to the sunshade. The system in this embodiment also includes a computerized sunroof panel and sunshade controller. The controller operates programming to monitor operation of the electric machine, determine a presence of the obstruction during the monitored operation, and command the electric machine to stop and reverse the sunshade based upon the determined presence.

In some embodiments, the computerized sunroof panel and sunshade controller further operates programming to monitor activation of a remote command to close the sunshade and command initiation of a closure event of the sunshade based upon the monitored activation.

In some embodiments, monitoring the activation of the remote command includes receiving an activation command from a key fob device.

In some embodiments, monitoring the activation of the remote command includes receiving an activation command from a smartphone device.

In some embodiments, the computerized sunroof panel and sunshade controller further operates programming to monitor data from a rain sensor device and command initiation of a closure event of the sunshade based upon the data from the rain sensor device.

In some embodiments, the spring force displacement member within the leading-edge portion of the sunshade includes a coil spring operable to compress as the sunshade contacts the obstruction.

In some embodiments, the spring force displacement member within the leading-edge portion of the sunshade includes a flex arm operable to bend as the sunshade contacts the obstruction.

In some embodiments, the sunshade includes a plastic tray, and the spring force displacement member within the leading-edge portion of the sunshade includes accordion-shaped bend in the plastic tray operable to bend as the sunshade contacts the obstruction.

In some embodiments, the computerized sunroof panel and sunshade controller further operates programming to command the electric machine providing motive force to the sunshade to begin moving to the second closed position and command an electric machine providing motive force to the sunroof panel to begin moving to the first closed position with a time lag relative to the electric machine providing motive force to the sunshade.

In some embodiments, the system further includes a compliant body structure interface providing a surface for the sunshade to seal against in the second closed position and including a body structure spring force member operable to deform when the sunshade contacts the obstruction while the sunshade is moving to the second closed position.

According to one alternative embodiment, a sunroof panel and sunshade assembly system includes a moveable sunroof panel operable to selectively move to a first closed position within a sunroof opening of a vehicle and a sunshade operable to selectively move to a second closed position within the sunroof opening. The sunshade includes a leading-edge portion disposed along an edge of the sunshade in a direction in which the sunshade moves to reach the second closed position, and a spring force displacement member within the leading-edge portion of the sunshade. The spring force displacement member is operable to deform when the sunshade contacts an obstruction while the sunshade is moving to the second closed position. The system further includes an electric machine providing motive force to the sunshade. The system further includes a computerized sunroof panel and sunshade controller. The controller operates programming to monitor operation of the electric machine, determine whether the obstruction is present within the sunroof opening based upon the monitored operation, and, when the obstruction is determined to be present, command the electric machine to stop and reverse the sunshade. When the obstruction is not determined to be present, the controller operates programming to determine successful closure of the sunshade based upon the monitored operation command to the sunroof panel to move to the first closed position based upon the determined successful closure.

In some embodiments, the computerized sunroof panel and sunshade controller further operates programming to monitor activation of a remote command to close the sunshade and command initiation of a closure event of the sunshade based upon the monitored activation.

In some embodiments, monitoring the activation of the remote command includes receiving an activation command from a key fob device.

In some embodiments, monitoring the activation of the remote command includes receiving an activation command from a smartphone device.

In some embodiments, the computerized sunroof panel and sunshade controller further operates programming to monitor data from a rain sensor device and command initiation of a closure event of the sunshade based upon the data from the rain sensor device.

In some embodiments, the system further includes a compliant body structure interface providing a surface for the sunshade to seal against in the second closed position and including a body structure spring force member operable to deform when the sunshade contacts the obstruction while the sunshade is moving to the second closed position.

According to one alternative embodiment, a method for controlling a vehicle sunroof panel and sunshade assembly is provided. The method includes operating a closure event of a sunshade of the vehicle sunroof panel and sunshade assembly including using an electric machine to provide motive force to move the sunshade toward a closed position. The sunshade includes a leading-edge portion including a spring force displacement member operable to deform when the sunshade contacts an obstruction. The method further includes, within a computerized sunroof panel and sunshade controller, operating programming to monitor operation of the electric machine, determine a presence of the obstruction based upon the monitored operation, and command the electric machine to stop and reverse the sunshade based upon the determined presence.

In some embodiments, the method further includes monitoring activation of a remote command to close the sunshade, and commanding initiation of a closure event of the sunshade based upon the monitored activation.

In some embodiments, the method further includes monitoring data from a rain sensor device and commanding initiation of a closure event of the sunshade based upon the data from the rain sensor device.

The above features and advantages and other features and advantages of the present disclosure are readily apparent from the following detailed description of the best modes for carrying out the disclosure when taken in connection with the accompanying drawings.

DETAILED DESCRIPTION

Figure 1:
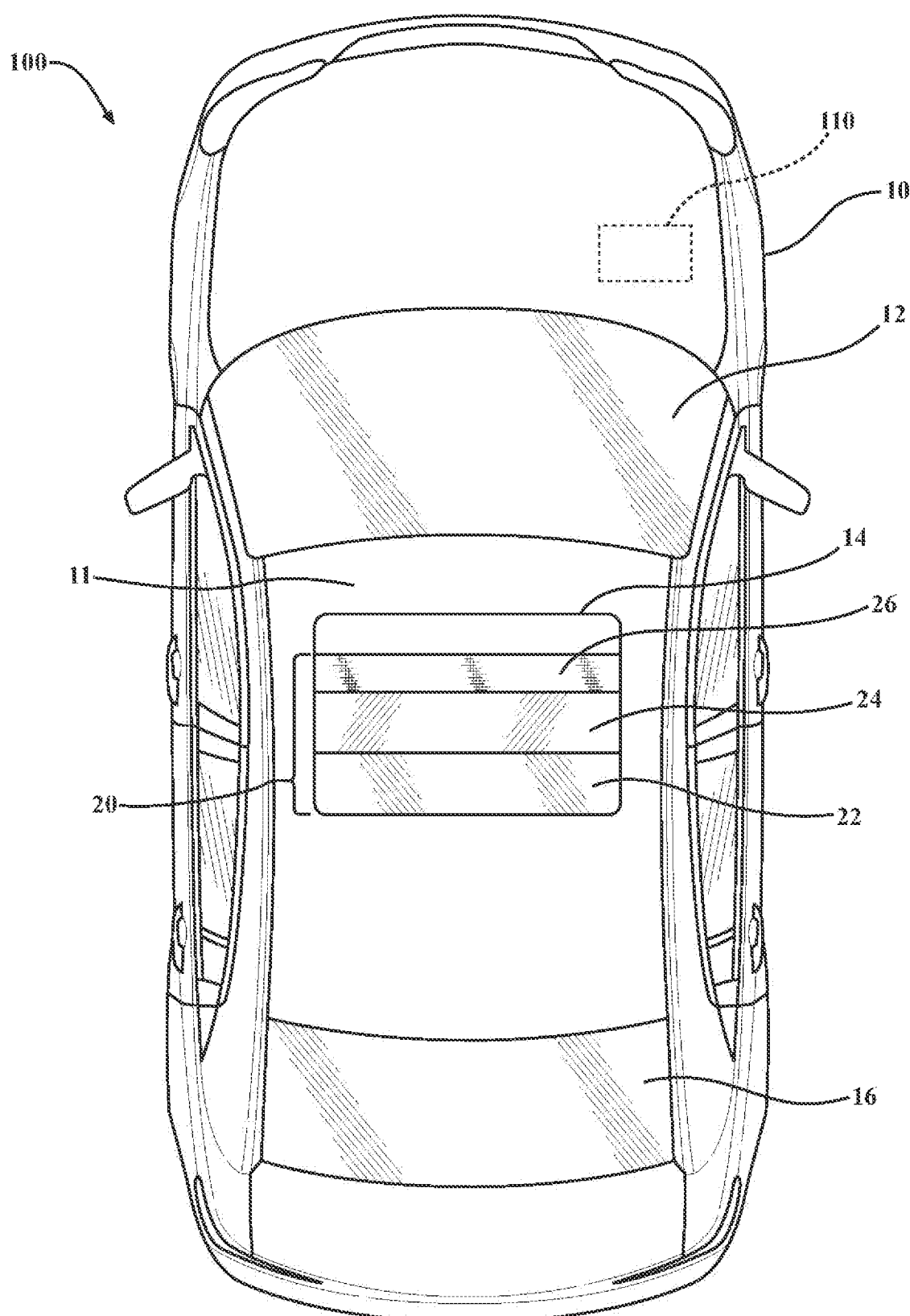
FIG. 1 schematically illustrates a vehicle in top view including an exemplary sunroof panel and sunshade assembly system, in accordance with the present disclosure.

Sunroofs and other moveable panels upon a vehicle may be in an open state or a closed state at given times during operation of the vehicle. Conditions exist where a sunroof or moveable panel in an open state may be desirable to move into a closed state. If a user is within the vehicle, a control button or input device may be provided within the vehicle to enable the user to command the sunroof or moveable panel to close. In other situations, a command to close a sunroof or other moveable panel may be useful if provided upon a remote device such as a key fob or as a software application upon a smart phone. In still other situations, an automated command to close the sunroof or other moveable panel may be useful, for example, as controlled by an output from a rain sensor. A key fob is a device, frequently provided with the purchase of a vehicle and included with keys of the vehicle, that includes a plurality of activation buttons and provides commands to the vehicle, for example, through a radio signal.

Panels moving under electrical power are subject to rules, for example, to avoid a panel causing damage. Rules may be stricter when a remote closure or when receiving a command from afar is used to initiate a sunroof panel closure event. According to one embodiment, while closing, the sunroof or moveable panel may be commanded to initiate a stop and reverse direction event based upon either a threshold resistive force being applied to the panel or a sensor device such as an infrared sensor detecting an obstruction in the opening being closed. Rules additionally may instruct certain reactions to a stop and reverse direction event, for example, with desirable reactions including returning the sunroof or moveable panel to a position occupied by the panel prior to the initiation of the closing event or to a position some defined threshold minimum distance away from a closed position. Throughout the disclosure, references to a sunroof are intended to include a moveable panel upon a vehicle operable to selectively close an opening in the vehicle.

According to one embodiment, the disclosed system may be configurable or calibratable to meet specific specifications. In one embodiment, the disclosed system may be calibrated to meet the specifications of a rule requiring that the panel stop moving when a threshold force is applied to resist movement of the panel. Without prior closure of a sunshade, such a rule applies to closure of the sunroof panel. However, if a sunshade is successfully closed without an obstruction being sensed in the sunroof opening, the above rule no longer applies to subsequent closure of the sunroof panel in the same sunroof opening. By utilizing a sunshade with increased sensitivity to sensing an obstruction in the sunroof opening, closure of the associated sunroof panel in the same sunroof opening is made easier.

A sunroof may include a sunshade which may be selectively partially or fully closed while the sunroof panel is open. The sunshade may be constructed with soft cloth or other similar flexible material. Such a flexible sunshade may be able to be coiled upon a spool when the sunshade is retracted, for example, with either a torsional spring or an electric machine aiding in coiling the flexible material upon the spool. In another embodiment, the sunshade may be constructed with a rigid or semi-rigid plastic or polymer panel. A rigid plastic sunshade may be retracted into a pocket within a roof liner of the passenger compartment.

A sunroof panel may be controlled by one or more electric machines providing output torque which may be mechanically transformed into motive force upon the sunroof panel. A sunshade may be similarly or sympathetically moved with the sunroof panel. A sunshade may include one or more electric machines providing output torque which may be mechanically transformed into motive force upon the sunshade. A sunshade may additionally or alternatively include a mechanical connection with the sunroof panel, where closing the sunroof panel may provide motive force to close the sunshade.

In one embodiment, the sunshade may be equipped with a cross-rod fastened to and extending across a leading-edge of the sunshade. A sunshade may include or present a rectangular portion covering or partially covering the sunroof opening. The leading-edge is the portion of the sunshade that defines an edge of the sunshade within the sunroof opening and which contacts or gets close to the edge of the sunroof opening when the sunshade is moved to a closed position.

A sunroof panel and sunshade assembly system is provided that enables remote closure of the sunroof panel. Rules provide testing procedures to be passed in order to enable remote closure of a sunroof panel. The sunroof panel and sunshade assembly provided herein includes a sunshade with a compliant leading-edge that, when placed into contact with an obstacle or obstruction during a sunroof panel closure event, gradually displaces or deforms from an initial orientation. This gradual displacement of the leading-edge of the sunshade provides for a more gradual increase in resistive force against the sunroof panel and sunshade assembly as compared to a rigid sunshade or a sunshade without a compliant leading-edge. Such a gradual increase in the resistive force may be more easily detected than a more rapid or drastic increase in force resulting from the obstruction being squeezed between two rigid members.

A compliant leading-edge may include various embodiments. In one embodiment, a cross-rod fastened to and extending across the leading-edge may be constructed with a flexible bar constructed with a pliable material such as a polymer or a thin-gauge spring steel wire. Further, the sunshade may include a central structural member which is connected to a drive mechanism useful to provide motive force to the sunshade. The leading-edge may be attached to the central structural member with springs or flexible structural members, such that a resistive force applied to the leading-edge in a direction toward the central structural member may deform the springs or the flexible structural members, thereby enabling gradual displacement of the leading-edge or deformation/compression of the sunshade between the leading-edge and the central structural member.

FIG. 1 schematically illustrates a vehicle 10 in top view including a sunroof panel and sunshade assembly system 100. The vehicle 10 includes a body structure 11, a front window 12, a sunroof opening 14, and a rear window 16. The sunroof opening 14 is illustrated as a rectangle with rounded corners and bounded on four sides by body structure 11. A sunroof panel and sunshade assembly 20 is illustrated including an optional fixed glass panel 22, a moveable sunroof panel 24, and a sunshade 26. In the illustrated example, the fixed glass panel 22 and the moveable sunroof panel 24 are illustrated covering approximately just over half of the sunroof opening 14. The moveable sunroof panel 24 is operable to move into a closed position such that the fixed glass panel 22 and the moveable sunroof panel together cover and effectively close off an entirety of the sunroof opening 14. The sunshade 26 is deployed to cover approximately half of the area of sunroof opening 14 left uncovered by the fixed glass panel 22 and the moveable sunroof panel 24.

The system 100 includes the sunroof panel and sunshade assembly 20 and a sunroof and sunshade controller 110. The controller 110 is a computerized device or a group of computerized devices operable to execute programming and provide for monitoring of data and generation of electronic commands.

The moveable sunroof panel 24 is operable to selectively move to a first closed position within the sunroof opening 14. The sunshade 26 is operable to selectively move to a second closed position within the sunroof opening 14, wherein the second closed position is in a lower in-vehicle position as compared to the first closed position.

Figure 2:
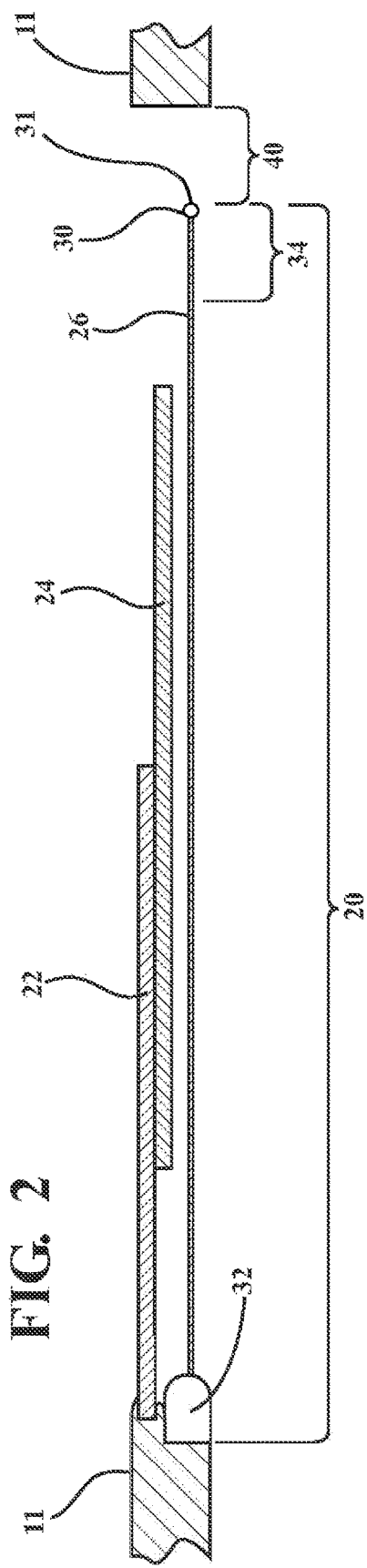
FIG. 2 schematically illustrates in cross sectional side view the sunroof panel and sunshade assembly of FIG. 1, in accordance with the present disclosure.

FIG. 2 schematically illustrates in cross sectional side view the sunroof panel and sunshade assembly 20. The sunroof panel and sunshade assembly 20 includes the fixed glass panel 22, the moveable sunroof panel 24, and the sunshade 26. The fixed glass panel 22 is affixed to a portion of the body structure 11. The moveable sunroof panel 24 may translate to a left of the illustration to move into a fully open position or state. In one embodiment, the body structure 11 may include a recess to enable the moveable sunroof panel 24 to fully open or more fully retract from the sunroof opening. The sunshade 26 includes an exemplary soft cloth material that may be retracted or coiled within spool device 32 mounted to the body structure 11. A cross-rod 30 is attached to or part of the sunshade 26 along a leading-edge 31 of the sunshade 26. A leading-edge portion 34 of the sunshade 26 is operable to displace or deform in an event that some obstruction is present within a gap 40 between the sunshade 26 and a portion of the body structure 11 against which the sunshade 26 is to seal against. In the event that the leading-edge portion 34 of the sunshade 26 is displaced or deformed by pressing against an obstruction, the movement of the sunshade 26 in a closing operation, a movement from left to right in the illustration of FIG. 2, will use more force to incrementally move the sunshade 26. This increased force or the increased resistive force experienced by the sunshade 26 may be monitored as a motor speed difference and/or an increased current draw upon an electric machine providing motive force to the sunshade 26.

Figure 3:
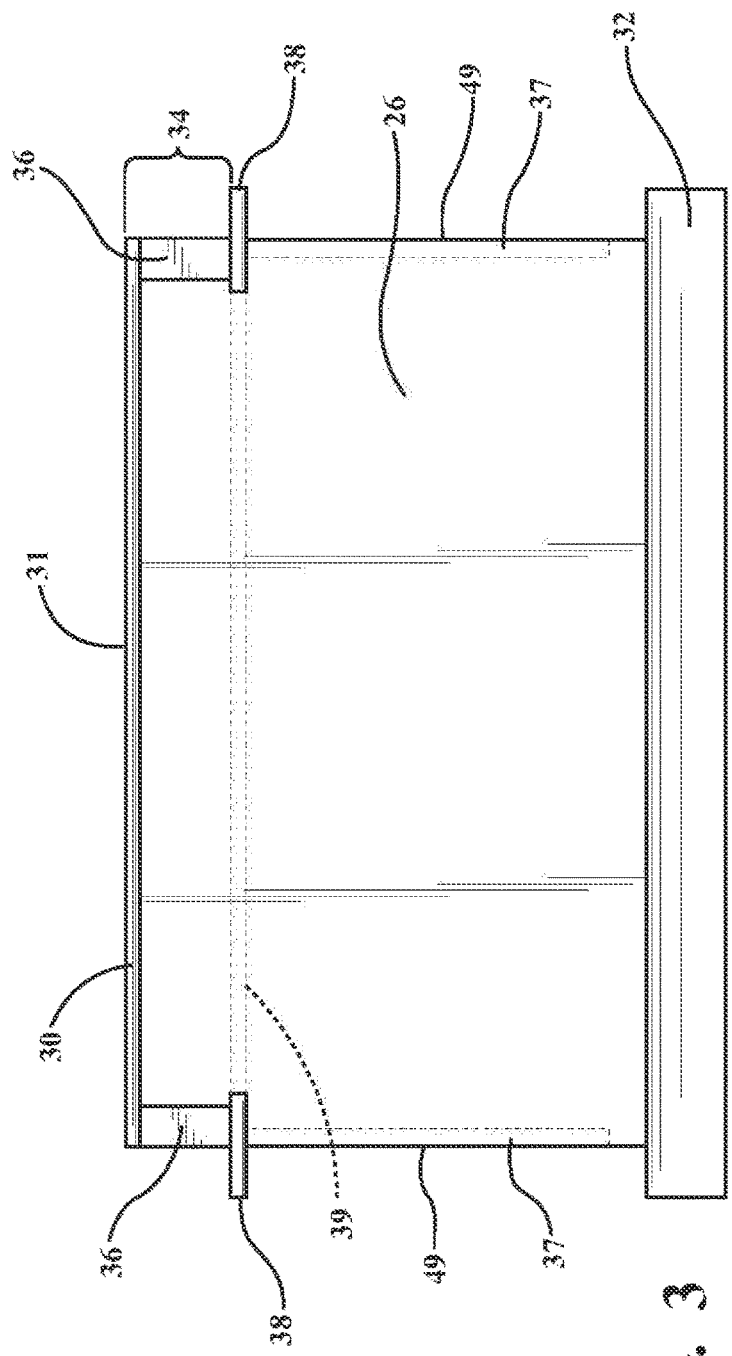
FIG. 3 schematically illustrates in top view the sunshade of FIG. 1, in accordance with the present disclosure.

FIG. 3 schematically illustrates in top view the sunshade 26. The sunshade 26 may be described as a sunshade of the sunroof panel and sunshade assembly 20 of FIG. 2. The sunshade 26 is illustrated including the spool device 32, the cross-rod 30, and the leading-edge portion 34. In the embodiment of FIG. 3, two central structural members 38 are illustrated attached to side portions of the sunshade 26. The two central structural members 38 are operable to receive motive force and apply the force to the sunshade 26 in order to move the sunshade 26.

The cross-rod 30 is attached to the sunshade 26. The cross-rod 30 is attached to the each of the two central structural members 38 with a respective spring force displacement member 36. The two spring force displacement members 36 provide an ability of the leading-edge portion 34 to displace when force is applied to the leading-edge 31. The spring force displacement member 36 includes an internal spring member operable to provide force to maintain the cross-rod 30 at a distance from the two structural members 38. When a force is applied to the leading-edge 31, force applied by the cross-rod 30 and force applied by the two central structural members 38 compresses the leading-edge portion 34.

The sunshade 26 includes two side edges 49 parallel to each other which translate alongside the body structure bordering the sides of the sunroof opening 14 of FIG. 1 as the sunshade moves. The leading-edge 31 is perpendicular to these side edges 49. The leading-edge portion 34 runs perpendicular to the side edges 49. The leading-edge portion 34 is disposed on a side of the sunshade 26 in a direction which the sunshade 26 moves to reach a closed position.

Dotted lines illustrate an optional second cross-bar 39 that may optionally be used to join the two central structural members and provide stability. Additionally, dotted lines illustrate two optional shade guidance rods 37 that may be used to guide movement of the sunshade 26 as it translates between the open and closed positions.

Figure 4:
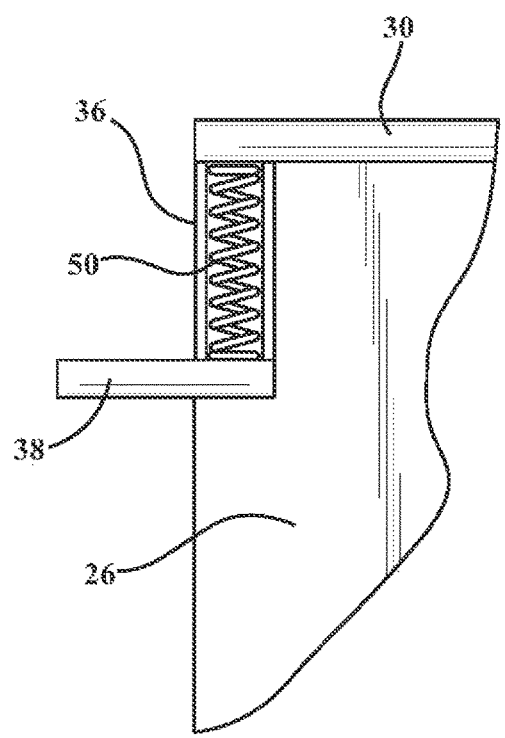
FIG. 4 schematically illustrates in top sectional view the spring force displacement member of FIG. 3, in accordance with the present disclosure.

FIG. 4 schematically illustrates in top sectional view the spring force displacement member 36. The spring force displacement member 36 is illustrated attached to the central structural member 38 of sunshade 26 and additionally attached to the cross-rod 30. The spring force displacement member 36 is illustrated including one or more coil spring 50 providing a force against both the central structural member 38 and the cross-rod 30, maintaining a distance between the central structural member 38 and the cross-rod 30. The coil spring 50 is exemplary and may alternatively include a type of spring-force or compressible material such as foam which provides progressively increasing force as the object or material is compressed. If a resistive force is applied to the cross-rod 30, for example, by an obstruction pressing against the cross-rod 30 as the sunshade 26 is moving toward a closed position, the coil spring 50 may compress and enable displacement or deformation of the leading-edge portion of the sunshade 26.

Figure 5:
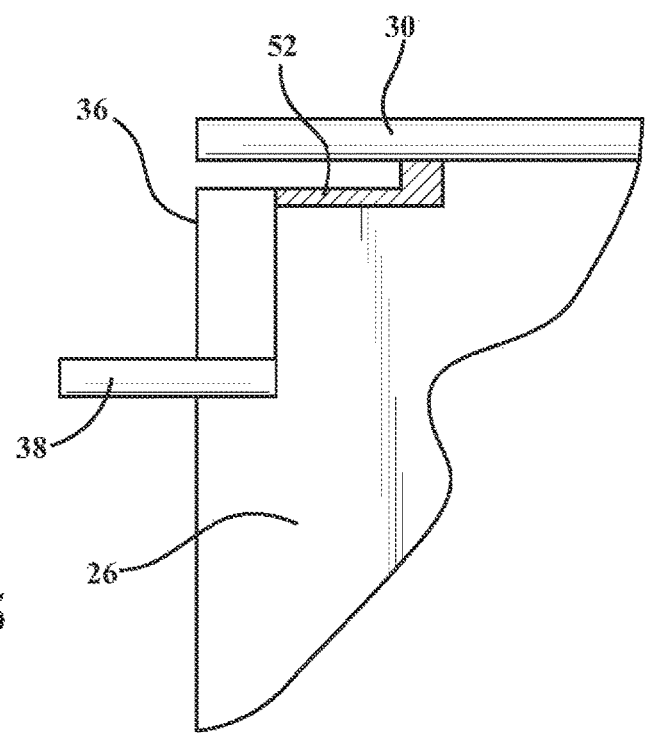
FIG. 5 schematically illustrates in top view an alternative embodiment of the spring force displacement member of FIG. 3, in accordance with the present disclosure.

FIG. 5 schematically illustrates in top view an alternative embodiment of the spring force displacement member 36. The spring force displacement member 36 is illustrated attached to the central structural member 38 of sunshade 26 and additionally attached to the cross-rod 30. The spring force displacement member 36 is illustrated including a flex arm 52. The flex arm 52 is configured to bend as resistive force is transmitted through the cross-rod 30. If a resistive force is applied to the cross-rod 30, for example, by an obstruction pressing against the cross-rod 30 as the sunshade 26 is moving toward a closed position, the flex arm 52 may bend and enable displacement or deformation of the leading-edge portion of the sunshade 26.

Figure 6:
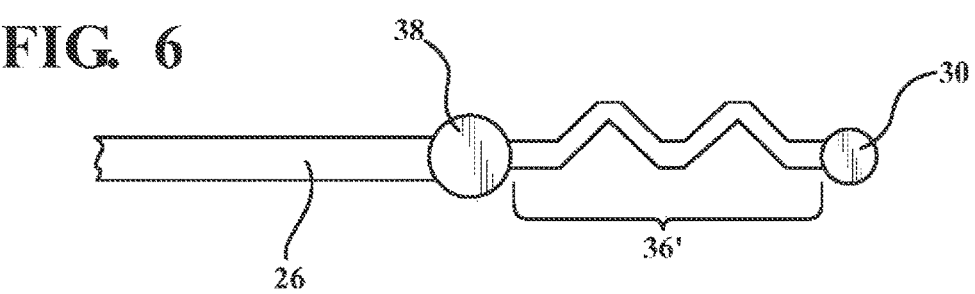
FIG. 6 schematically illustrates in side view an alternative embodiment of the sunshade of FIG. 1 including a rigid plastic tray, in accordance with the present disclosure.

FIG. 6 schematically illustrates in vehicle side view an alternative embodiment of the sunshade 26 including a rigid plastic tray. The sunshade 26 includes a central structural member 38 and a spring force displacement member 36'. The spring force displacement member 36' is illustrated attached to the central structural member 38 of sunshade 26 and additionally attached to a cross-rod 30. The spring force displacement member 36' is illustrated including an alternating bend or accordion-shaped pattern in the plastic tray. If a resistive force is applied to the cross-rod 30, for example, by an obstruction pressing against the cross-rod 30 as the sunshade 26 is moving toward a closed position, the spring force displacement member 36' may compress and enable displacement or deformation of the leading-edge portion of the sunshade 26.

Figure 7:
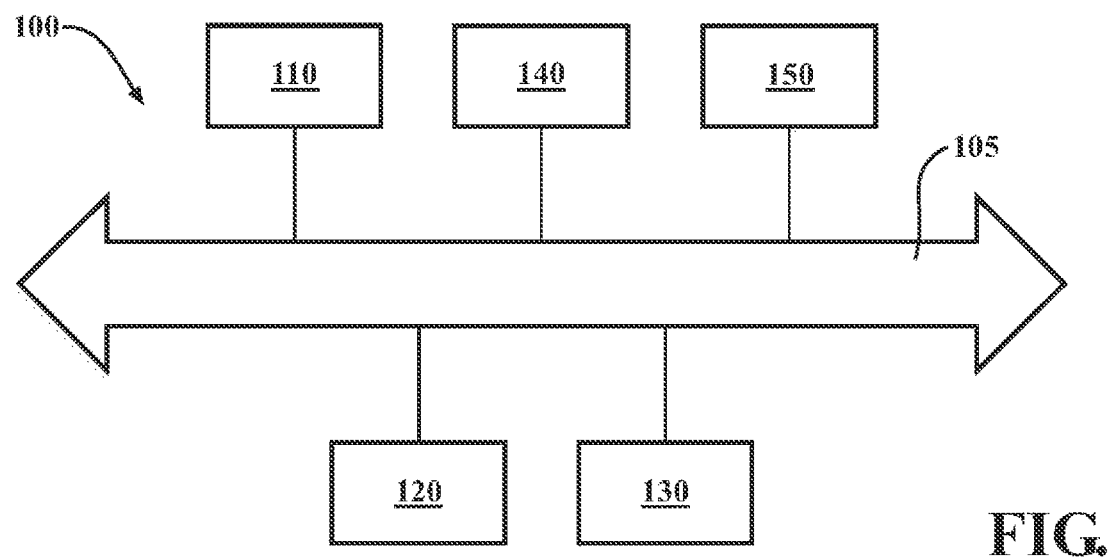
FIG. 7 schematically illustrates electronic communication within an exemplary sunroof panel and sunshade assembly system including the sunroof and sunshade controller of FIG. 1, an electric machine controlling movement of the sunroof panel, an electric machine controlling movement of the sunshade, a rain sensor, and a communications device, in accordance with the present disclosure.

FIG. 7 schematically illustrates an exemplary sunroof panel and sunshade assembly system 100 including the sunroof and sunshade controller 110, an electric machine 120 controlling movement of the sunroof panel, an electric machine 130 controlling movement of the sunshade, a rain sensor 140, and a communications device 150. The communications device 150 may include a wireless communication system capable of receiving signals from a key fob device and/or telecommunications signals from a cellular network such as commands from a smartphone device. A bus communication device 105 is illustrated providing for electronic communication between the attached devices. The controller 110, an electric machine 120 controlling movement of the sunroof panel, an electric machine 130 controlling movement of the sunshade, a rain sensor 140, and a communications device 150 are each connected to the bus communication device 105. The controller 110 may receive data signals through the bus communication device 105 regarding information such as current draw data from the electric machine 130, data from the rain sensor 140, and commands communication from a remote user device through the communications device 150. The controller 110 may generate and communicate electronic commands through the bus communication device 105 to the various devices attached to the bus communication device 105.

Figure 8:
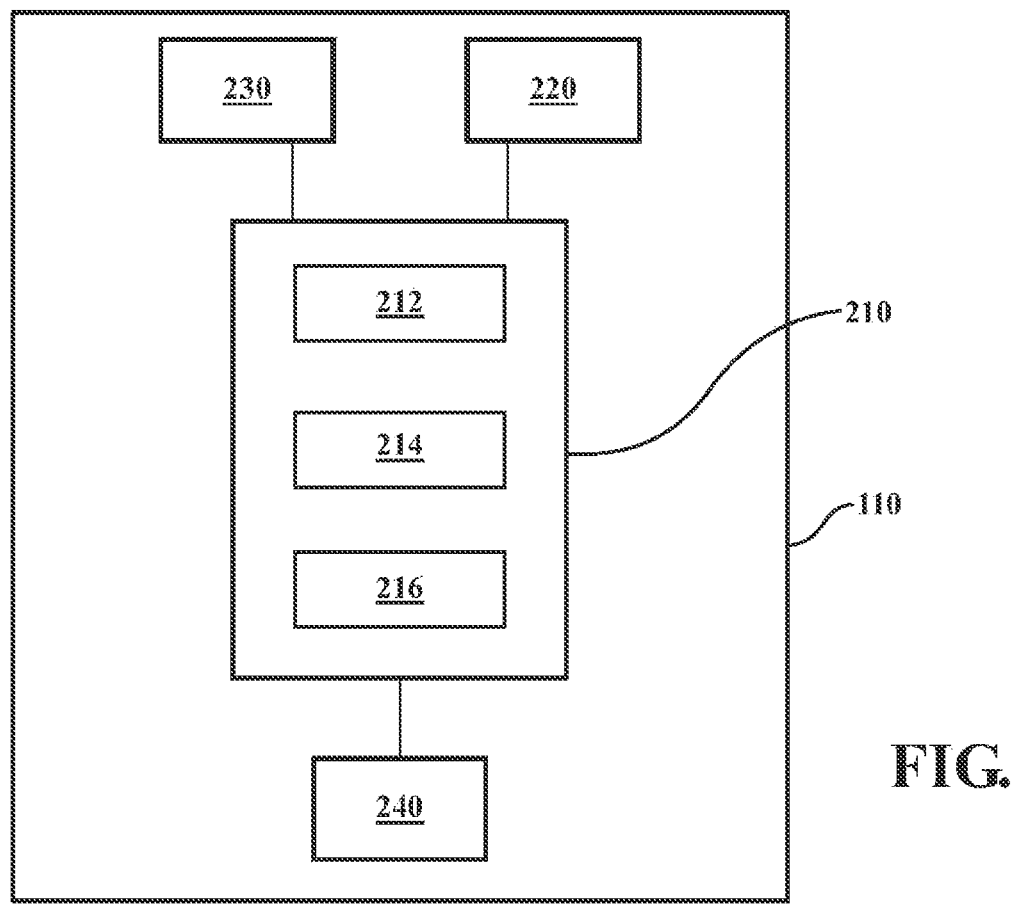
FIG. 8 schematically illustrates the sunroof panel and sunshade controller of FIG. 1, in accordance with the present disclosure.

Various computerized controllers may be utilized within the disclosed system to operate the disclosed process. Computerized controllers may include a computerized device including a computerized processor including memory capable of storing programmed executable code. A computerized controller may be operated upon a single computerized device or may span several computerized devices. FIG. 8 schematically illustrates the sunroof panel and sunshade controller 110. Sunroof panel and sunshade controller 110 includes processing device 210, communications device 220, data input output device 230, and memory storage device 240. The controller 110 may include other components and some of the components are not present in some embodiments.

The processing device 210 may include memory, e.g., read only memory (ROM) and random-access memory (RAM), storing processor-executable instructions and one or more processors that execute the processor-executable instructions. In embodiments where the processing device 210 includes two or more processors, the processors may operate in a parallel or distributed manner. Processing device 210 may execute the operating system of the sunroof panel and sunshade controller 110. Processing device 210 may include one or more modules executing programmed code or computerized processes or methods including executable steps. Illustrated modules may include a single physical device or functionality spanning multiple physical devices. In the illustrative embodiment, the processing device 210 also includes a sunroof panel and sunshade electric machine control module 212, an obstruction diagnosis module 214, and an obstruction reaction module 216, which are described in greater detail below.

The data input output device 230 is a device that is operable to take data gathered from sensors and devices throughout the vehicle and process the data into formats readily usable by processing device 210. Data input output device 230 is further operable to process output from processing device 210 and enable use of that output by other devices or computerized controllers throughout the vehicle.

The communications device 220 may include a communications/data connection with a bus device configured to transfer data to different components of the system and may include one or more wireless transceivers for performing wireless communication.

The memory storage device 240 is a device that stores data generated or received by the sunroof panel and sunshade controller 110. The memory storage device 240 may include, but is not limited to, a hard disc drive, an optical disc drive, and/or a flash memory drive.

The control module 212 includes programmed code operable to gather information about and provide control commands to electric machines and/or other electronic devices controlling the sunroof panel and the sunshade.

The obstruction diagnosis module 214 includes programmed code operable to receive and process information related to diagnosing presence of an obstruction in the sunroof opening, which may include but not be limited to analysis of electric motor speed by an electric machine providing motive force to the sunshade.

The obstruction reaction module 216 includes programmed code operable to receive and process information from various sources and employ a process to stop movement of the sunroof panel and the sunshade and subsequently to open the sunroof panel and the sunshade to preset or determined positions based upon permitting the obstruction to be cleared from the sunroof opening.

Sunroof panel and sunshade controller 110 is provided as an exemplary computerized device capable of executing programmed code to execute control schemes related to control of power shades and corresponding power windows. A number of different embodiments of the controller 110, devices attached thereto, and modules operable therein are envisioned, and the disclosure is not intended to be limited to examples provided herein.

Figure 9:
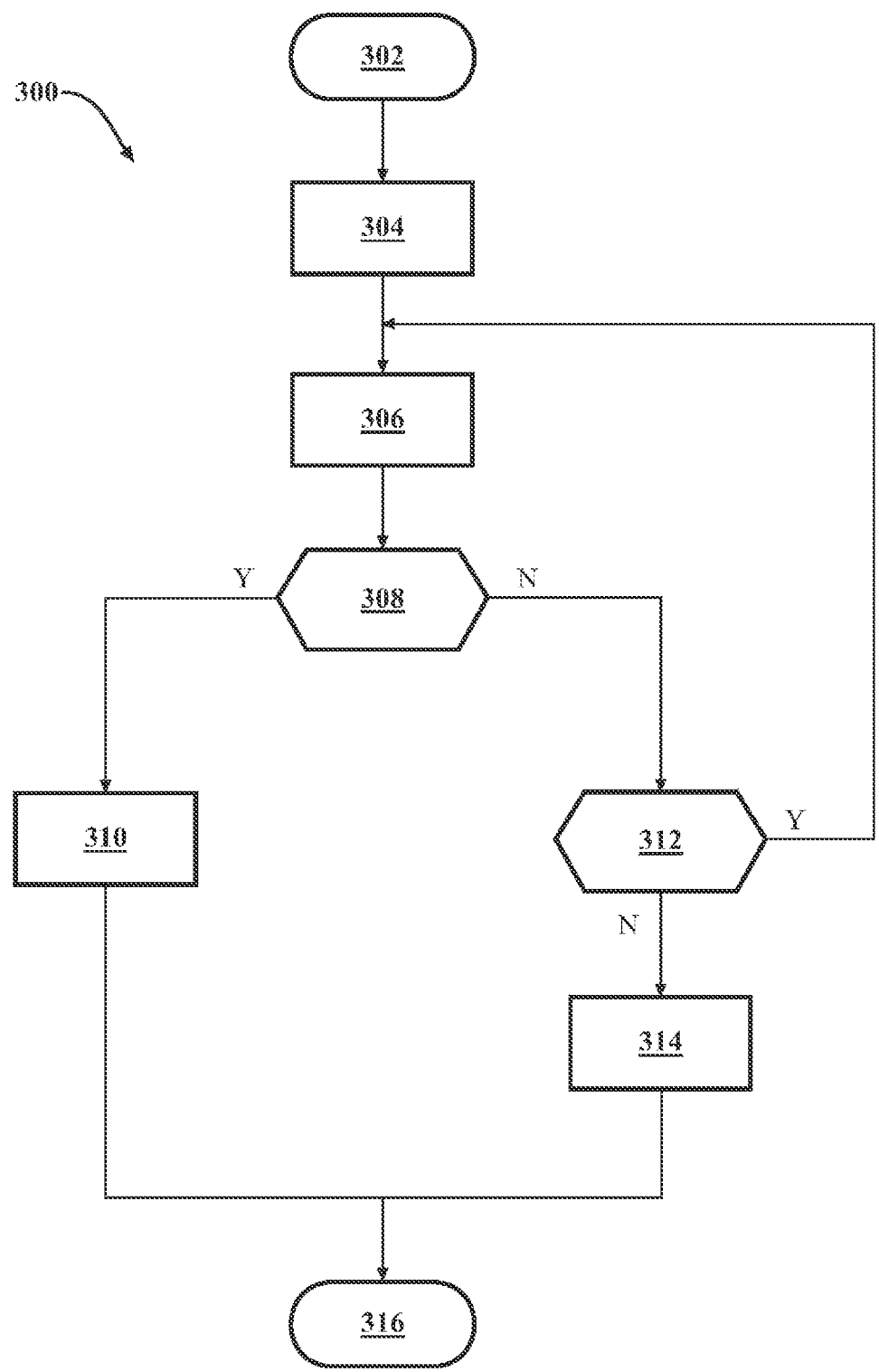
FIG. 9 is a flowchart illustrating a method for control of a vehicle sunroof panel and sunshade assembly, in accordance with the present disclosure.

FIG. 9 is a flowchart illustrating a method 300 for control of a vehicle sunroof panel and sunshade assembly. The method 300 starts at block 302. At block 304, data from vehicle sensors are monitored to determine occurrence of a request to close the sunroof panel and sunshade assembly system 100 of FIG. 1. The data may originate from a user providing an input to a key fob, a user providing an input through a smartphone device, a rain sensor providing data that precipitation is falling or is imminent, or other similar data. At block 306, a command is initiated or maintained to close the sunshade 26 of FIG. 1. In one embodiment, a simultaneous command may be provided to additionally close the sunroof panel 24 of FIG. 1. Such a command to close the sunroof panel lags behind the command to close the sunshade, as the deformation of the leading-edge portion of the sunshade is advantageously equipped according to the disclosure to provide increased sensitivity and increased time to sense an obstruction in the sunroof opening as compared to sensing the obstruction through movement of the sunroof panel. In such an embodiment, one may initiate motion of the sunroof panel some time delay period after initiating motion of the sunshade, such that the sunroof panel follows the sunshade in closing, both moving simultaneously but with the sunshade closing first. In another embodiment, the sunshade may be commanded to close in isolation of the sunroof panel, with a command to close the sunroof panel commencing after the sunshade has successfully closed.

At block 308, a determination is made whether an obstruction is determined to be in the sunroof opening. If an obstruction is sensed or presence of the obstruction is determined to be likely, the method advances to block 310. If no obstruction is sensed or deemed likely, the method advances to block 312. At block 310, movements of the sunshade and sunroof panel are stopped. The sunshade and sunroof panel are subsequently moved to open positions or positions preset to enable clearance of the obstruction. In one embodiment, a signal may be sent to in-vehicle and/or user devices to sound an alarm that an obstruction was detected during a closure event. When the sunroof panel and the sunshade are in open or retracted positions, the method proceeds to block 316.

At block 312, a determination is made whether the sunshade has reached a closed position. If the sunshade has not reached a closed position, the method returns to block 306 where the command to close the sunshade is maintained. If the sunshade has reached a closed position, the method proceeds to block 314, where a command to close the sunroof panel is initiated or maintained. Because the sunshade successfully closing indicates that there is no obstruction in the sunroof opening, the sunroof panel may be closed in block 314 without concern for detecting or sensing presence of an obstruction. The method then advances to block 316. A block 316, the method 300 ends. A number of additional or alternative method steps are envisioned, and the disclosure is not intended to be limited to the examples provided herein.

Figure 10:
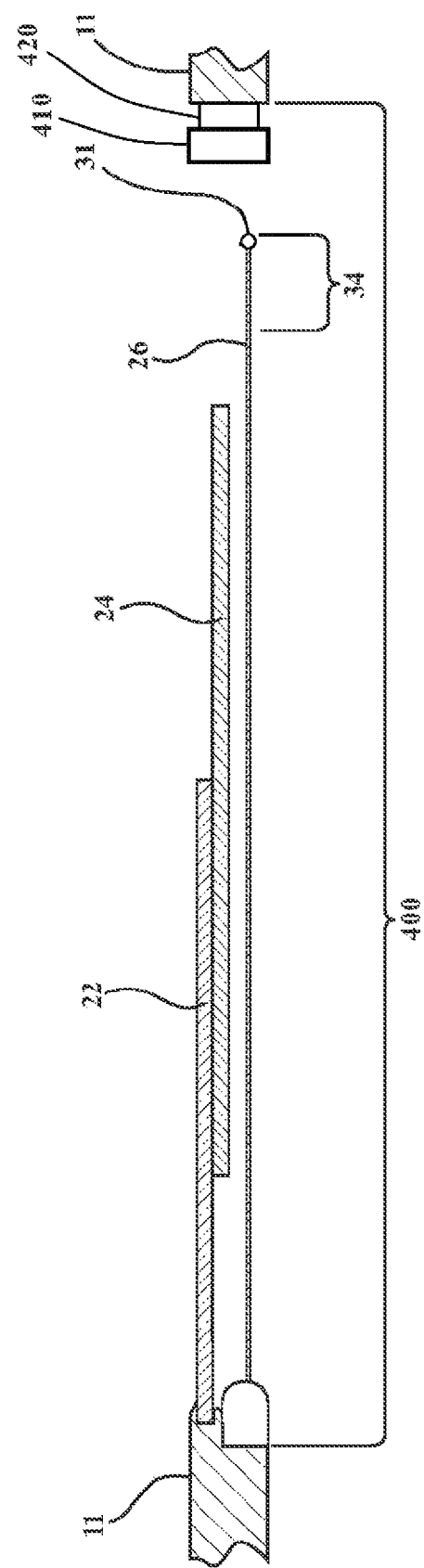
FIG. 10 schematically illustrates in cross sectional side view an alternative embodiment of a sunroof panel and sunshade assembly, in accordance with the present disclosure.

FIG. 10 schematically illustrates in cross sectional side view an alternative embodiment of a sunroof panel and sunshade assembly 400. The e assembly 400 includes the fixed glass panel 22, the moveable sunroof panel 24, and the sunshade 26. The fixed glass panel 22 is affixed to a portion of the body structure 11. The moveable sunroof panel 24 may translate to a left of the illustration to move into a fully open position or state. In one embodiment, the body structure 11 may include a recess to enable the moveable sunroof panel 24 to fully open or more fully retract from the sunroof opening.

The sunshade 26 includes an exemplary soft cloth material that may be retracted or coiled within a spool device mounted to the body structure 11. A cross-rod is attached to or part of the sunshade 26 along a leading-edge 31 of the sunshade 26. A leading-edge portion 34 of the sunshade 26 is operable to displace or deform in an event that some obstruction is present within a gap between the sunshade 26 and a portion of the body structure 11 against which the sunshade 26 is to seal against.

Further, the assembly 400 includes a compliant body structure interface 410 which includes a body structure spring force member 420. The compliant body structure interface 410 and the body structure spring force member 420 may be separate objects, or they may represent portions of a single object. The compliant body structure interface 410 provides a surface for the moveable sunroof panel 24 and for the sunshade 26 to seal against, for example, to keep rain and wind out of the vehicle when closed. The body structure spring force member 420 includes a spring loaded or otherwise reactive element which normally extends the compliant body structure interface 410 in a left direction in the illustration of FIG. 10 but which compresses and permits the compliant body structure interface 410 to move in a right direction in the illustration when an obstruction is pressed upon by the moving sunshade 26.

Deformation of the leading-edge portion 34 and of the body structure spring force member 420 together act to slow an increasing compressive force applied to an obstruction and give the corresponding computerized controller additional time to identify and react to the presence of the obstruction. In the event that the leading-edge portion 34 of the sunshade 26 is displaced or deformed by pressing against an obstruction, the movement of the sunshade 26 in a closing operation, a movement from left to right in the illustration of FIG. 2, will use more force to incrementally move the sunshade 26. This increased force or the increased resistive force experienced by the sunshade 26 may be monitored as a motor speed difference and/or an increased current draw upon an electric machine providing motive force to the sunshade 26. In an alternative embodiment, the compliant body structure interface 410 may be utilized in isolation of the sunshade 26 with the leading-edge portion 34. The compliant body structure interface 410 may be operable to provide the described deformation and additional time for the system to react with a sunshade not operable to similarly deform.

While the best modes for carrying out the disclosure have been described in detail, those familiar with the art to which this disclosure relates will recognize various alternative designs and embodiments for practicing the disclosure within the scope of the appended claims.

What is claimed is:

1. A sunroof panel and sunshade assembly system, comprising:
   a moveable sunroof panel operable to selectively move to a first closed position within a sunroof opening of a vehicle;
   a sunshade operable to selectively move to a second closed position within the sunroof opening, the sunshade including:
      a leading-edge portion disposed along an edge of the sunshade in a direction in which the sunshade moves to reach the second closed position;
      a spring force displacement member within the leading-edge portion of the sunshade, wherein the spring force displacement member is operable to deform when the sunshade contacts an obstruction while the sunshade is moving to the second closed position; and
   an electric machine providing motive force to the sunshade; and
   a computerized sunroof panel and sunshade controller, operating programming to:
      monitor operation of the electric machine;
      determine a presence of the obstruction during the monitored operation; and
      command the electric machine to stop and reverse the sunshade based upon the determined presence.

2. The sunroof panel and sunshade assembly system of claim 1, wherein the computerized sunroof panel and sunshade controller further operates programming to:
   monitor activation of a remote command to close the sunshade; and
   command initiation of a closure event of the sunshade based upon the monitored activation.

3. The sunroof panel and sunshade assembly system of claim 2, wherein monitoring the activation of the remote command includes receiving an activation command from a key fob device.

4. The sunroof panel and sunshade assembly system of claim 2, wherein monitoring the activation of the remote command includes receiving an activation command from a smartphone device.

5. The sunroof panel and sunshade assembly system of claim 1, wherein the computerized sunroof panel and sunshade controller further operates programming to:
   monitor data from a rain sensor device; and
   command initiation of a closure event of the sunshade based upon the data from the rain sensor device.

6. The sunroof panel and sunshade assembly system of claim 1, wherein the spring force displacement member within the leading-edge portion of the sunshade includes a coil spring operable to compress as the sunshade contacts the obstruction.

7. The sunroof panel and sunshade assembly system of claim 1, wherein the spring force displacement member within the leading-edge portion of the sunshade includes a flex arm operable to bend as the sunshade contacts the obstruction.

8. The sunroof panel and sunshade assembly system of claim 1, wherein the sunshade includes a plastic tray; and
   wherein the spring force displacement member within the leading-edge portion of the sunshade includes accordion-shaped bend in the plastic tray operable to bend as the sunshade contacts the obstruction.

9. The sunroof panel and sunshade assembly system of claim 1, wherein the computerized sunroof panel and sunshade controller further operates programming to:
   command the electric machine providing motive force to the sunshade to begin moving to the second closed position; and
   command an electric machine providing motive force to the sunroof panel to begin moving to the first closed position with a time lag relative to the electric machine providing motive force to the sunshade.

10. The sunroof panel and sunshade assembly system of claim 1, further comprising a compliant body structure interface providing a surface for the sunshade to seal against in the second closed position and including a body structure spring force member operable to deform when the sunshade contacts the obstruction while the sunshade is moving to the second closed position.

11. A sunroof panel and sunshade assembly system, comprising:
   a moveable sunroof panel operable to selectively move to a first closed position within a sunroof opening of a vehicle;
   a sunshade operable to selectively move to a second closed position within the sunroof opening, the sunshade including:
      a leading-edge portion disposed along an edge of the sunshade in a direction in which the sunshade moves to reach the second closed position;
      a spring force displacement member within the leading-edge portion of the sunshade, wherein the spring force displacement member is operable to deform when the sunshade contacts an obstruction while the sunshade is moving to the second closed position; and
   an electric machine providing motive force to the sunshade; and
   a computerized sunroof panel and sunshade controller, operating programming to:
      monitor operation of the electric machine;
      determine whether the obstruction is present within the sunroof opening based upon the monitored operation;
      when the obstruction is determined to be present, command the electric machine to stop and reverse the sunshade;
      when the obstruction is not determined to be present, determine successful closure of the sunshade based upon the monitored operation; and
      command the sunroof panel to move to the first closed position based upon the determined successful closure.

12. The sunroof panel and sunshade assembly system of claim 11, wherein the computerized sunroof panel and sunshade controller further operates programming to:
   monitor activation of a remote command to close the sunshade; and
   command initiation of a closure event of the sunshade based upon the monitored activation.

13. The sunroof panel and sunshade assembly system of claim 12, wherein monitoring the activation of the remote command includes receiving an activation command from a key fob device.

14. The sunroof panel and sunshade assembly system of claim 12, wherein monitoring the activation of the remote command includes receiving an activation command from a smartphone device.

15. The sunroof panel and sunshade assembly system of claim 11, wherein the computerized sunroof panel and sunshade controller further operates programming to:
monitor data from a rain sensor device; and
command initiation of a closure event of the sunshade based upon the data from the rain sensor device.

16. The sunroof panel and sunshade assembly system of claim 11, further comprising a compliant body structure interface providing a surface for the sunshade to seal against in the second closed position and including a body structure spring force member operable to deform when the sunshade contacts the obstruction while the sunshade is moving to the second closed position.

17. A method for control of a vehicle sunroof panel and sunshade assembly, comprising:
operating a closure event of a sunshade of the vehicle sunroof panel and sunshade assembly, including using an electric machine to provide motive force to move the sunshade toward a closed position and wherein the sunshade includes a leading-edge portion including a spring force displacement member operable to deform when the sunshade contacts an obstruction; and
within a computerized sunroof panel and sunshade controller, operating programming to:
monitor operation of the electric machine;
determine a presence of the obstruction based upon the monitored operation; and
command the electric machine to stop and reverse the sunshade based upon the determined presence.

18. The method of claim 17, further comprising:
monitoring activation of a remote command to close the sunshade via the controller; and
commanding initiation of the closure event of the sunshade via the controller based upon the monitored activation.

19. The method of claim 17, further comprising:
monitoring data from a rain sensor device via the controller; and
commanding initiation of the closure event of the sunshade via the controller based upon the data from the rain sensor device.

* * * * *